US010319047B2

(12) United States Patent
Braz et al.

(10) Patent No.: US 10,319,047 B2
(45) Date of Patent: Jun. 11, 2019

(54) IDENTIFICATION OF LIFE EVENTS WITHIN SOCIAL MEDIA CONVERSATIONS

(71) Applicant: International Business Machines Corporation, Armonk, NY (US)

(72) Inventors: Alan Braz, Campinas (BR); Paulo R. Cavalin, Rio de Janeiro (BR); Rogerio A. de Paula, São Paulo (BR); Luis G. Moyano, Rio de Janeiro (BR); Claudio S. Pinhanez, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 14/753,094

(22) Filed: Jun. 29, 2015

(65) Prior Publication Data

US 2016/0378760 A1 Dec. 29, 2016

(51) Int. Cl.
*G06Q 50/00* (2012.01)
*G06Q 10/10* (2012.01)

(52) U.S. Cl.
CPC .......... *G06Q 50/01* (2013.01); *G06Q 10/107* (2013.01)

(58) Field of Classification Search
CPC .................................................. G06Q 50/01
See application file for complete search history.

(56) References Cited

U.S. PATENT DOCUMENTS

| 8,812,602 | B2 | 8/2014 | Srikrishna et al. |
| 2007/0121843 | A1 | 5/2007 | Atazky et al. |
| 2008/0243531 | A1 | 10/2008 | Hyder et al. |
| 2010/0023341 | A1 | 1/2010 | Ledbetter et al. |
| 2010/0070485 | A1 | 3/2010 | Parsons et al. |
| 2011/0041080 | A1* | 2/2011 | Fleischman ............ G06Q 30/02 715/751 |
| 2012/0016817 | A1 | 1/2012 | Smith et al. |
| 2012/0054277 | A1 | 3/2012 | Gedikian |
| 2012/0239497 | A1 | 9/2012 | Nuzzi |

(Continued)

OTHER PUBLICATIONS

Anonymous, "Context Evaluation of Posts in Social Media," An IP.com Prior Art Database Technical Disclosure, Mar. 6, 2015, p. 1-2, IP.com No. 000240840.

(Continued)

*Primary Examiner* — Mark D Featherstone
*Assistant Examiner* — Tony Wu
(74) *Attorney, Agent, or Firm* — Michael O'Keefe (57) ABSTRACT

Identifying life events within social network feeds. The method may include receiving social media data. The method may include identifying life event data within the social media data. The method may include determining a life event probability score associated with a life event class for the life event data using metadata. The method may include assigning a first life event class to each item of life event data based on the life event probability score. The method may include creating conversations by grouping the life event data. The method may include extracting metadata. The method may include determining a conversation probability score for each conversation based on the metadata and the life event probability score associated with each item of life event data. The method may include assigning a second life event class based on the conversation probability score. The method may include displaying the conversations based on user preferences.

17 Claims, 8 Drawing Sheets

(56) References Cited

U.S. PATENT DOCUMENTS

| | | |
|---|---|---|
| 2013/0159132 A1 | 6/2013 | Adams |
| 2014/0025491 A1 | 1/2014 | Nagarajan et al. |
| 2014/0089334 A1* | 3/2014 | Adibi .................... G06Q 50/01 707/758 |
| 2014/0229552 A1* | 8/2014 | Ranganath .............. H04L 51/32 709/206 |
| 2014/0297403 A1 | 10/2014 | Parsons et al. |
| 2014/0372898 A1 | 12/2014 | Ayres et al. |
| 2015/0046543 A1 | 2/2015 | Childress et al. |
| 2015/0088593 A1 | 3/2015 | Raghunathan et al. |
| 2015/0234806 A1* | 8/2015 | Bhagwan ............ G06F 17/2765 705/7.18 |

OTHER PUBLICATIONS

Di Eugenio et al., "Detecting Life Events in Feeds from Twitter," IEEE Seventh International Conference on Semantic Computing, 2013, p. 274-277, IEEE Computer Society.

Mell et al., "The NIST Definition of Cloud Computing," National Institute of Standards and Technology, Sep. 2011, p. 1-3, Special Publication 800-145.

Viégas et al., "Visualizing Email Content: Portraying Relationships from Conversational Histories," CHI 2006, Apr. 22-27, 2006, 10 Pages, ACM, Montréal, Québec, Canada.

* cited by examiner

IDENTIFICATION OF LIFE EVENTS WITHIN SOCIAL MEDIA CONVERSATIONS

FIELD OF INVENTION

The present invention relates generally to the field of computing, and more particularly to social media.

BACKGROUND

Users of social media may post information to social media networks that convey information related to life events. A life event may be a change in a person's circumstances. For example, marriages, travel, graduations, or anniversaries may be considered life events. Information relating to life events may be included in individual social media posts, such as Facebook® (Facebook and all Facebook-based trademarks and logos are trademarks or registered trademarks of Facebook, Inc. and/or its affiliates) status updates or Twitter® (Twitter and all Twitter-based trademarks and logos are trademarks or registered trademarks of Twitter, Inc. and/or its affiliates) tweets, or in conversations with other social media users within a social media network, such as Facebook® comments to a status update or Twitter® replies to tweets.

SUMMARY

According to one embodiment, a method for identifying life events within a social network feed. The method may include receiving a plurality of social media data. The method may also include identifying a plurality of life event data within the plurality of social media data. The method may further include determining a life event probability score associated with each of a plurality of life event classes for each of the plurality of life event data using a plurality of metadata associated with each of the plurality of life event data and a plurality of content associated with each of the plurality of life event data. The method may also include assigning a first life event class within the plurality of life event classes to each of the plurality of life event data based on the life event probability score. The method may further include creating a plurality of conversations by grouping the plurality of life event data associated with a common social media exchange. The method may also include extracting a plurality of metadata associated with the plurality of created conversations. The method may further include determining a conversation probability score associated with each of the plurality of life event classes for each of the plurality of created conversations based on the extracted metadata and the determined life event probability score associated with each of the plurality of life event data within each of the plurality of created conversations. The method may also include assigning a second life event class within the plurality of life event classes to each of the plurality of created conversations based on the determined conversation probability score. The method may further include displaying the plurality of created conversations based on user preferences.

According to another embodiment, a computer system for identifying life events within a social network feed. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include receiving a plurality of social media data. The computer system may also include identifying a plurality of life event data within the plurality of social media data. The computer system may further include determining a life event probability score associated with each of a plurality of life event classes for each of the plurality of life event data using a plurality of metadata associated with each of the plurality of life event data and a plurality of content associated with each of the plurality of life event data. The computer system may also include assigning a first life event class within the plurality of life event classes to each of the plurality of life event data based on the life event probability score. The computer system may further include creating a plurality of conversations by grouping the plurality of life event data associated with a common social media exchange. The computer system may also include extracting a plurality of metadata associated with the plurality of created conversations. The computer system may further include determining a conversation probability score associated with each of the plurality of life event classes for each of the plurality of created conversations based on the extracted metadata and the determined life event probability score associated with each of the plurality of life event data within each of the plurality of created conversations. The computer system may also include assigning a second life event class within the plurality of life event classes to each of the plurality of created conversations based on the determined conversation probability score. The computer system may further include displaying the plurality of created conversations based on user preferences.

According to yet another embodiment, a computer program product for identifying life events within a social network feed. The computer program product may include one or more computer-readable storage devices and program instructions stored on at least one of the one or me tangible storage devices, the program instructions executable by a processor. The computer program product may include program instructions to receive a plurality of social media data. The computer program product may also include program instructions to identify a plurality of life event data within the plurality of social media data. The computer program product may further include program instructions to determine a life event probability score associated with each of a plurality of life event classes for each of the plurality of life event data using a plurality of metadata associated with each of the plurality of life event data and a plurality of content associated with each of the plurality of life event data. The computer program product may also include program instructions to assign a first life event class within the plurality of life event classes to each of the plurality of life event data based on the life event probability score. The computer program product may further include program instructions to create a plurality of conversations by grouping the plurality of life event data associated with a common social media exchange. The computer program product may also include program instructions to extract a plurality of metadata associated with the plurality of created conversations. The computer program product may further include program instructions to determine a conversation probability score associated with each of the plurality of life event classes for each of the plurality of created conversations based on the extracted metadata and the determined life event probability score associated with each of the plurality of life event data within each of the plurality of created conversations. The computer program product may also include program instructions to assign a second life event class within the plurality of life event classes to each of the plurality of created conversations based on the determined conversation probability score. The computer program product may further include program instructions to display the plurality of created conversations based on user preferences.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to social media. The following described exemplary embodiments provide a system, method, and program product to, among other things, identify life events within social media posts and conversations. Therefore, the present embodiment has the capacity to improve the technical field of social media by allowing user life events to be identified through user posts and messages. More specifically, the present embodiment may implement machine learning algorithms to understand the context within which user discussions in social media posts and determine the probability with which each discussion is associated with a specific life event.

As previously described, social media users may post personal information about events in their lives to a social media network that conveys information related to life events, such as travel, graduation, or anniversaries. Information relating to life events may be included in individual posts, such as Facebook® status updates or Twitter® tweets, or in conversations with other social media users within a social media network, such as Facebook® comments to a status update or Twitter® replies to tweets.

Identification of life events in a social media network associated with a specific user may provide a better understanding of the user since a great deal of user specific data is posted to the social network. Additionally, life events may allow for enhanced profiling of users that businesses may wish to target for a marketing campaign. For example, if a user posted a Facebook® message related to graduating from college, a company in the business of selling party supplies may be interested in disseminating marketing materials related to the sale of graduation balloons to the user or relatives of the user.

Identification of life events within social media posts may be hindered by elements of written natural language, such as ambiguity and irony. For example, a single post where one social media user simply posts the word "Congratulations!" may not identify the life event to which it is associated since use of the word "Congratulations!" without proper context may be ambiguous. Additionally, some social media posts may be part of an exchange of posts between social media users, such as a conversation. The potential complex structure experienced by a conversation may result in the dilution of information needed to classify each post within a conversation among two or more posts. Typically, social media post identification systems may only analyze a single post and not an exchange of posts between users. As such, it may be advantageous, among other things, to implement a system that is capable of identifying user life events using an exchange of user posts within a social media network.

According to one embodiment, information contained in social media conversations, such as replies, questions, answers, dialogues, comments, and other associated content, may aid in the interpretation of previously classified text. Data and metadata associated with conversations, such as the order of messages within the conversation, timestamps, and output of classifiers, may be used to construct new compound objects, or conversations, that may be easier to interpret and understand and provide additional information. A conversation may then be classified as being associated with a life event based on the information contained within the data and metadata.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify life events within social media conversations. According to at least one implementation, the present embodiment may implement machine learning algorithms to analyze a complete conversation exchange between social media users. The machine learning algorithms may be capable of identifying ambiguities of written natural language and lack of context or information using metadata associated with the exchange. Once identified, the conversations containing ambiguities and lack of contextual information may be associated with a life event to more accurately reflect the actual content of the posts.

Figure 1:
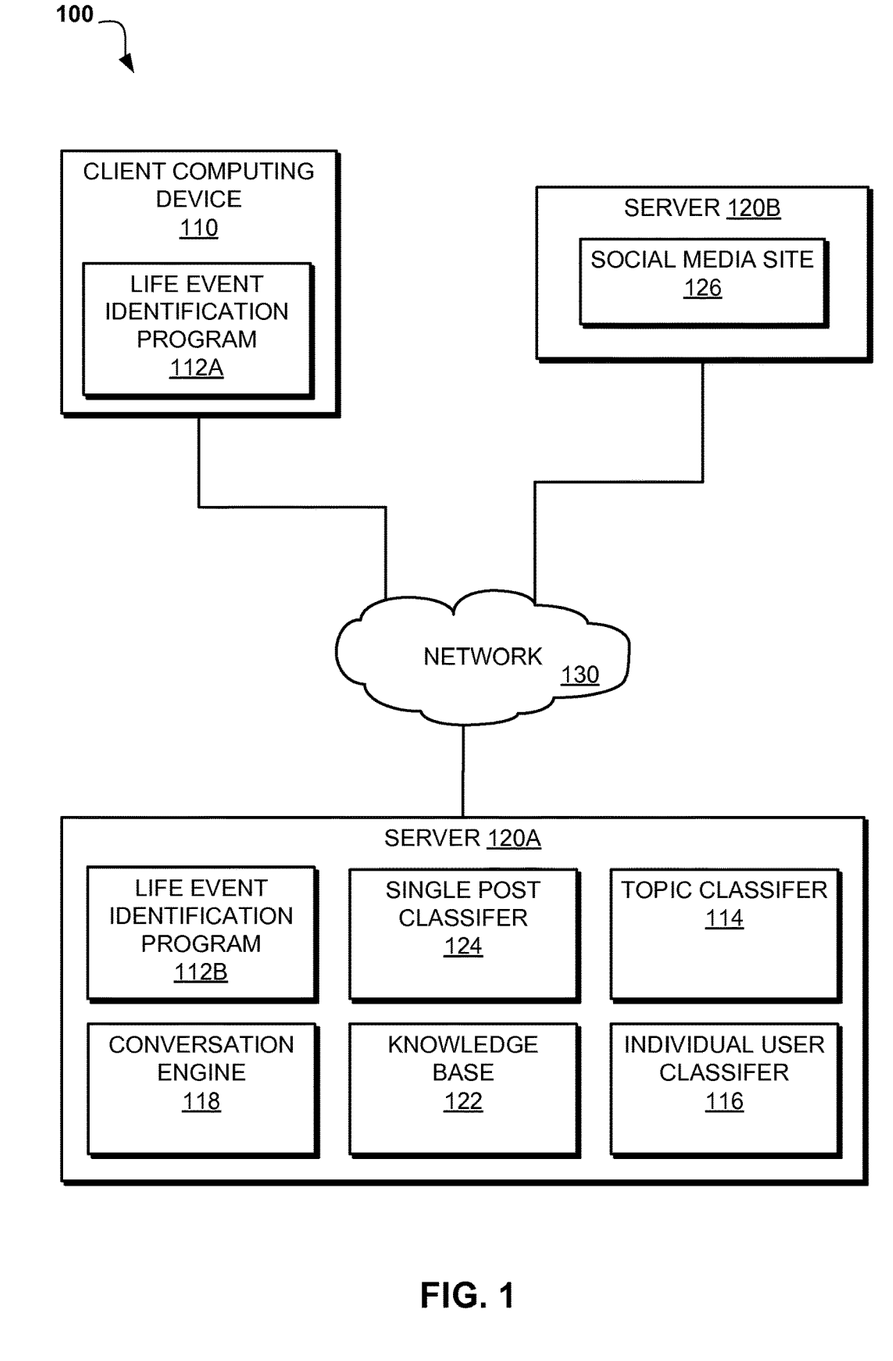
FIG. 1 is an exemplary networked computer environment, in accordance with one embodiment of the present invention.

Referring now to FIG. 1, an exemplary networked computer environment 100 is depicted, in accordance with one embodiment. The networked computer environment 100 may include client computing device 110 and server 120A, 120B interconnected via communication network 130. According to at least one implementation, networked computer environment 100 may include a plurality of client computing devices 110 and servers 120A, 120B.

Communication network 130 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 110 may be, for example, a mobile device, a telephone, a personal digital assistant, a netbook, a laptop computer, a tablet computer, a desktop computer, or any type of computing device capable of running a program and accessing a network. Client computing device 110 may be capable of hosting life event identification program 112A. Client computing device is described in more detail with reference to FIG. 6.

Server computer 120A, 120B may be a laptop computer, netbook computer, personal computer (PC), a desktop computer, or any programmable electronic device capable of hosting life event identification program 112B, topic classifier 114, individual user classifier 116, conversation engine 118, knowledge base 122, single post classifier 124, social media site 126, and communicating with client computing device 110 via network 130, in accordance with embodiments of the invention. As will be discussed with reference to FIG. 6, server computer 120A, 120B may include internal components 602a and external components 900a, respectively, and client computing device 110 may include internal components 602b and external components 900b, respectively. Server 120A, 120B may also operate in a cloud computing service model, such as Software as a Service (SaaS), Platform as a Service (PaaS), or Infrastructure as a Service (IaaS). Server 120A, 120B may also be located in a cloud computing deployment model, such as a private cloud, community cloud, public cloud, or hybrid cloud.

According to the present embodiment, social media site 126 may be a collection of files, including, for example, HTML files, CSS files, image files, and JavaScript files. Social media site 126 may also include other resources, such as audio files and video files. The collection of files on social media site 126 may be presented to a user as social media posts that include text, images, and videos.

Furthermore, topic classifier 114 may be a tool capable of classifying conversations of social media data, such as social media posts, messages, and replies. The conversations may be categorized by class, topic, or any other preconfigured indicator of interest to a user. A category may include areas of data, such as life events, personal events, and public events. Additionally, topic classifier 114 may categorize data by class. For example, a life event class may include data within the life event category, such as birthday life events, marriage life events, and graduation life events.

Additionally, individual user classifier 116 may be a tool that classifies a subset of individuals, or users, based on life event information associated with the individuals. The subset of individuals may be identified by individual user classifier 116 through social media data, such as a social media posts or messages, which mention or relate to a topic or category of interest.

Single post classifier 124 may be a tool capable of classifying a single social media post or message based on a given life event. For example, a single post classifier 124 may associate post containing or relating to a life event to specific life event class, such as graduation, birthday, or anniversary.

Conversation engine 118 may be a tool that identifies related social media data, such as posts or messages, belonging to the same exchange or conversation and associates the related social media data with each other. For example, user A may post a Twitter® message stating the user has graduated from college. User B may reply to user A's initial post with a congratulatory remark and ask what degree user A earned. User A may reply to user B's comment with a thank you message and a response message to User B's question. Since each of these social media posts are related to each other in a conversation flow, conversation engine 118 may associate the posts together to create a conversation.

Furthermore, knowledge base 122 may a repository that uses information posted by the individuals and new information derived from the conversation structure generated by conversation engine 118 to provide context and remove ambiguity from topic information in the social media data. Knowledge base 122 may also be a repository for dictionary words utilized by life event identification program 112A, 112B to identify life event data by filtering received social media data. Knowledge base 122 may be constantly used to enhance user profiles. For example, by parsing information from classified conversations, knowledge base 122 may infer family relationships, update birth information, and current employment.

Additionally, life event identification program 112A, 112B may be a program capable of identifying life events from a conversation on a user social media network. Life event identification program 112A, 112B is explained in further detail below with respect to FIG. 2.

Figure 2:
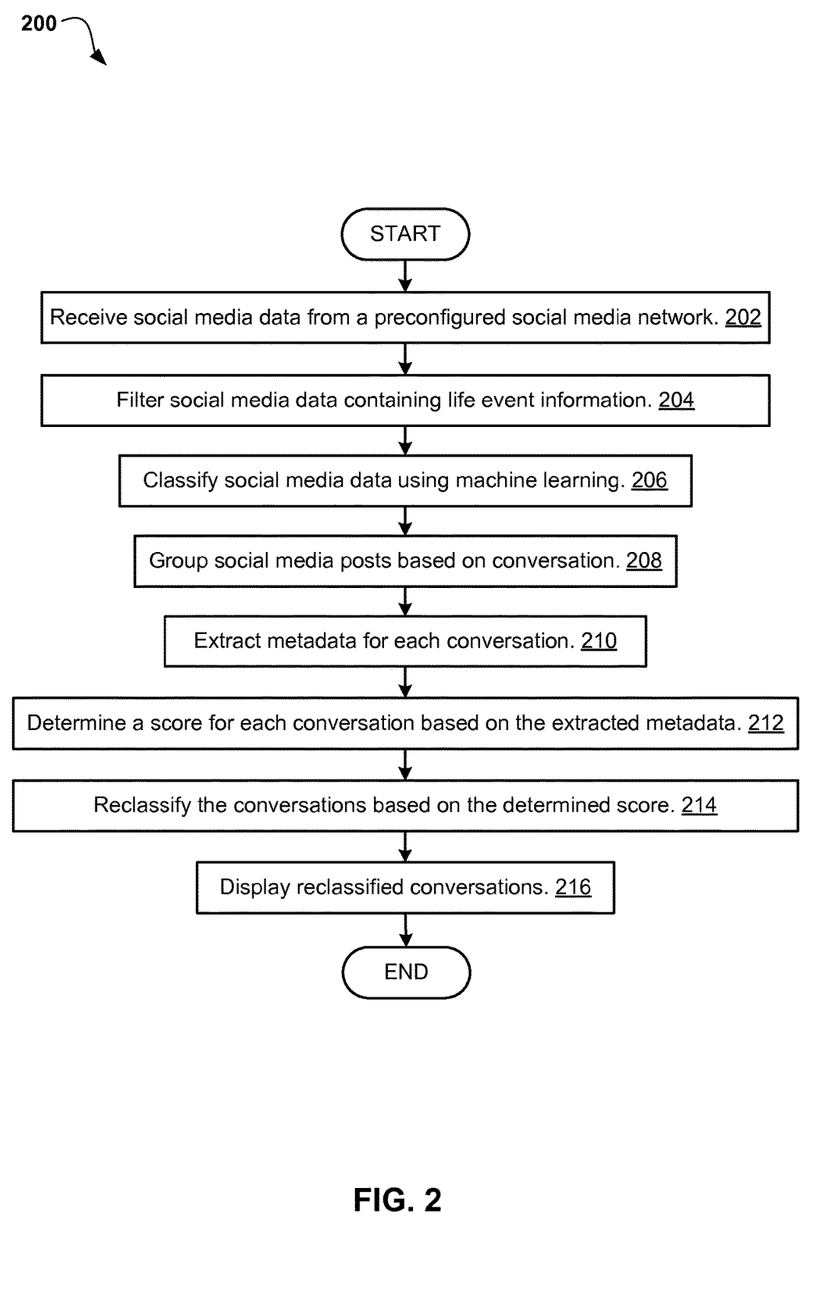
FIG. 2 illustrates a flowchart of the operational steps carried out by a program to identify life events within a social media conversation, in accordance with one embodiment of the present invention.

Referring now to FIG. 2, a flowchart 200 illustrating the operational steps carried out by a program to identify life events within a social media conversation is depicted, in accordance with one embodiment of the present invention. At 202, life event identification program 112A, 112B may receive social media data from preconfigured social media site 126, such as Twitter® and Facebook®. The received social media data may include individual social media posts, replies, messages, and comments.

Next at 204, the life event identification program 112A, 112B may filter out any received social media data not relating to life events in order to identify life event data. When the social media data is received by life event identification program 112A, 112B, the social media data may encompass different categories, such as life events, personal events, and public events. Since classification of social media data may be an expensive process, life event identification program 112A, 112B may filter the social media data to only include social media data relating life events, or life event data. Life event identification program 112A, 112B may filter the social media data by implementing a repository, such as knowledge base 122, containing words commonly associated with life events. For example, social media posts relating to a "graduation" life event may use forms of the word "graduate", such as "graduating", "graduation", and "graduates." Furthermore, life event identification program 112A, 112B may use Annotated Query Language (AQL) to filter the social media data. AQL may be a language for building extractors that extract structured information from unstructured or semi-structured text.

Then at 206, single post classifier 124 may classify the filtered life event data. Once the social media data not relating to life events is filtered out, single post classifier 124 may classify each item of life event data by assigning a single post probability to each item of life event data for each of a predefined number of life event classes, such as graduation, travel, birthday, or anniversary. The single post probability assigned to each item of social media data may correspond to the probability each item of life event data relates to a given life event class. For example, if a Facebook® status update by User A containing the words " . . . my birthday . . . " is identified as a life event post and the predefined life event classes are "graduation", "birthday" and "marriage", single post classifier 124 may determine a single post probability that the post corresponds to each predefined life event class. For example, the life event post by User A containing the words " . . . my birthday . . . " may have a 0.7 probability of relating to a "birthday" life event, a 0.1 probability of relating to a "graduation" life event, and a 0.0 probability of relating to a "marriage" life event. Therefore, single post classifier 124 may classify the life event post by User A as a "birthday" life event since the single post probability score associated with the "birthday" life event class is the highest probability among all life event classes.

Next at 208, conversation engine 118 may construct conversations using the individual life event data. As previously described, the life event data may be individual posts, messages, replies, or comments. When received, filtered, and classified, the life event data may not relate to other items of life event data despite each item of life event data being a part of a structured conversation between users. For example, User A may post a Twitter® tweet and User B may reply to User A's tweet. After classification, both User A's tweet and User B's tweet are separate items despite having a connection with each other in the form of a conversation on Twitter®. By analyzing metadata associated with the life event data, conversation engine 118 may create compound objects, or conversations, by linking related items of life event data together. For example, conversation engine 118 may determine User A's tweet and User B's reply tweet are two parts of a conversation and connect the two tweets together to create a compound object. Furthermore, conversation engine 118 may be capable of determining aspects of individual items of life event data, such as whether the item of life event data is a comment, a like, a reply, a favorite, a repost, or a share.

Then at 210, life event identification program 112A, 112B may extract metadata from each constructed conversation. After being constructed, each conversation may contain metadata not previously available with the individual items of life event data. The metadata for each conversation may include the users engaging in the conversation, additional information or data about the users participating in the conversation such as location or status, the total number of users, timestamp information, number of single posts in the conversation and classification results and probability scores of each item of life event data within the conversation obtained in step 206 by single post classifier 124. Life event identification program 112A, 112B may extract the metadata related to the conversation in order to properly assign a classification to the conversation as a whole.

Next at 212, life event identification program 112A, 112B may determine a conversation probability score for each conversation based on the extracted metadata. Similar to the score computation conducted in step 206 relating to each item of life event data, each conversation may have a probability score calculated for each life event topic. Life event identification program 112A, 112B may determine the probability score using n-tuples of information. The n-tuples of information may include the user that posted the life event data, the content of the life event data, the classification of the life event data, the probability score of the life event data, the output of the topic classifier and other relevant data. Using a mathematical function, life event identification program 112A, 112B may determine the probability score for the conversation. For example, a conversation may include a Facebook® post and two comments to that post. Using the metadata for each post and the conversation as a whole, life event identification program 112A, 112B may determine the conversation has a 0.9 probability the conversation relates to a "birthday" life event, a 0.1 probability the conversation relates to a "graduation" life event, and a 0.0 probability the conversation relates to a "marriage" life event.

Then at 214, life event identification program 112A, 112B classifies the conversation based on the determined conversation probability score. Once a conversation probability score has been determined, life event identification program 112A, 112B may classify the entire conversation based the determined conversation probability score. Even though life event identification program 112A, 112B calculated a probability score for each item of life event data in step 206, the calculated probability score for each item of life event data may not be representative of the conversation probability score. For example, a conversation that includes three posts, such as post A, post B, and post C, may be classified by life event identification program 112A, 112B as a "birthday" life event. However, post A may have been classified by single post classifier 124 as a "graduation" life event, post B may have been classified by single post classifier 124 as a "birthday" life event, and post C may have been classified by single post classifier 124 as a "marriage" life event. Since post A, post B, and post C may be ambiguous and lack context when not in a conversation, single post classifier 124 may not assign an accurate life event classification for each life event post. Therefore, life event identification program 112A, 112B may assign a classification to the conversation as a whole once the related life event posts have been grouped together into a conversation in order to provide a more accurate life event classification. Furthermore, the classification assigned by life event identification program 112A, 112B may be based on the life event topic with the highest conversation probability score. For example, if a conversation receives a 0.9 conversation probability score for a "birthday" life event but only a 0.3 conversation probability score for a "marriage" life event, life event identification program 112A 112B may classify the conversation as a "birthday" life event.

Additionally, since some conversations may be applicable to multiple life events, life event identification program 112A, 112B may assign multiple life event classes to a conversation if the conversation probability score for each class is above a preconfigured threshold. For example, if the preconfigured conversation probability score threshold for a conversation to be classified as a specific life event topic is 0.85, then a conversation with probability scores of 0.9 and 0.87 for a "birthday" life event and a "marriage" life event, respectively, may be classified as both a "birthday" life event and a "marriage" life event.

Next at 216, life event identification program 112A, 112B may present the classified conversation in a conversation report and single life event post data in a single life event post report post to a user. Life event identification program 112A, 112B may send the classified conversation to a user along with a report detailing statistical metadata, such as message times and frequency within the conversation, for the conversation through email or by displaying the report to a user through a graphical user interface associated with life event identification program 112A, 112B. Life event identification program 112A, 112B may also distribute a report detailing statistical information for each life event post used to create a conversation. For example, life event identification program 112A, 112B may summarize single life event post statistical information, such as the sender of a post, content of a post, timestamp for a post, life event class, and life event class probability calculated by single post classifier 124, into a single life event post report. The single life event post report is described in more detail with respect to FIG. 4. The conversation report is described in more detail with respect to FIG. 5.

Life event identification program 112A, 112B may utilize topic classifier 114 and individual user classifier 116 to filter data by topic, class, or individual depending on user preferences. Topic classifier 114 may be used to present information to a user applicable to a specific type of life event. For example, a user may be interested in reviewing social media data related to all birthday life events. Additionally, a user may be interested in a subclass of life events, such as users with a $30^{th}$ birthday within the past year. Individual user classifier 116 may identify social media users based on determined life events within social media networks and group the social media users into classes of interest to be presented to a user. For example, if a company is interested in targeting customers based on individuals most likely to purchase travel insurance, individual user classifier 116 may review all classified conversations and map users within the conversations into groups, such as a definitely traveling soon group, a possibly traveling soon group, and a not traveling soon group. Thereafter, the results of topic classifier 114 and individual user classifier 116 may be presented to a user.

Life event identification program 112A, 112B may also implement a repository, such as knowledge base 122, to make certain user determinations and classifications based on the classified conversations. For example, by reviewing classified conversations, life event identification program 112A, 112B may be able to determine family relationships between users, a user's current employment status, and a user's birth information. Life event identification program 112A, 112B may store the determined user information in a repository, such as knowledge base 122.

Figure 3:
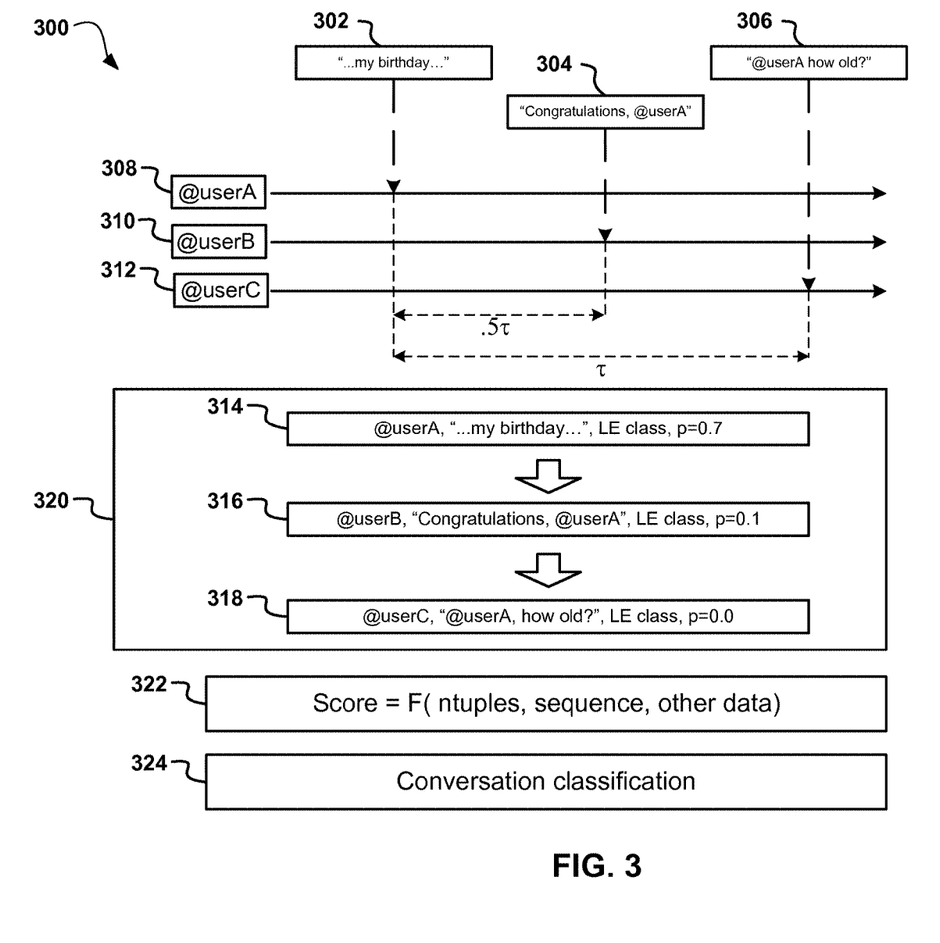
FIG. 3 is a functional block diagram illustrating the steps of a life event identification program, in accordance with one embodiment of the present invention.

Referring now to FIG. 3, a functional block diagram 300 illustrating the steps of a life event identification system is depicted, in accordance with one embodiment of the present invention. According to one embodiment, life event posts, such as post A 302, post B 304, and post C 306, may be received by life event identification program 112A, 112B. Post A 302 may be posted on User A's social media timeline 308 at t=0. Post B 304 may be posted on User B's social media timeline 310 at t=0.5τ. Post C 306 may be posted on User C's social media timeline 312 at t=τ. Single post data 314, 316, and 318, such as single post probability scores and life event classes, may then be determined for each post 302, 304, and 306 using machine learning. For example, post A 302 may have a calculated single post probability score of 0.7 for a "birthday" life event class and a 0.0 single post probability score for a "marriage" life event class. Since the highest single post probability score of all life event classes is 0.7 associated with a "birthday" life event class, single post classifier 124 may classify post A 302 as a "birthday" life event. Next, conversation engine 118 may create a conversation 320 by combining post A 302, post B 304, and post C 306 into a sequential order of related posts. Conversation engine 118 may also extract metadata specific to conversation 320 such as users involved in the conversation and time between each post. Next, a conversation probability score 322 may be calculated using the data and metadata related to conversation 320 and single post data 314, 316, and 318 and metadata related to post A 302, post B 304, and post C 306. Based on conversation probability score 322, life event identification program 112A, 112B may classify the conversation into an appropriate conversation classification 324.

Figure 4:
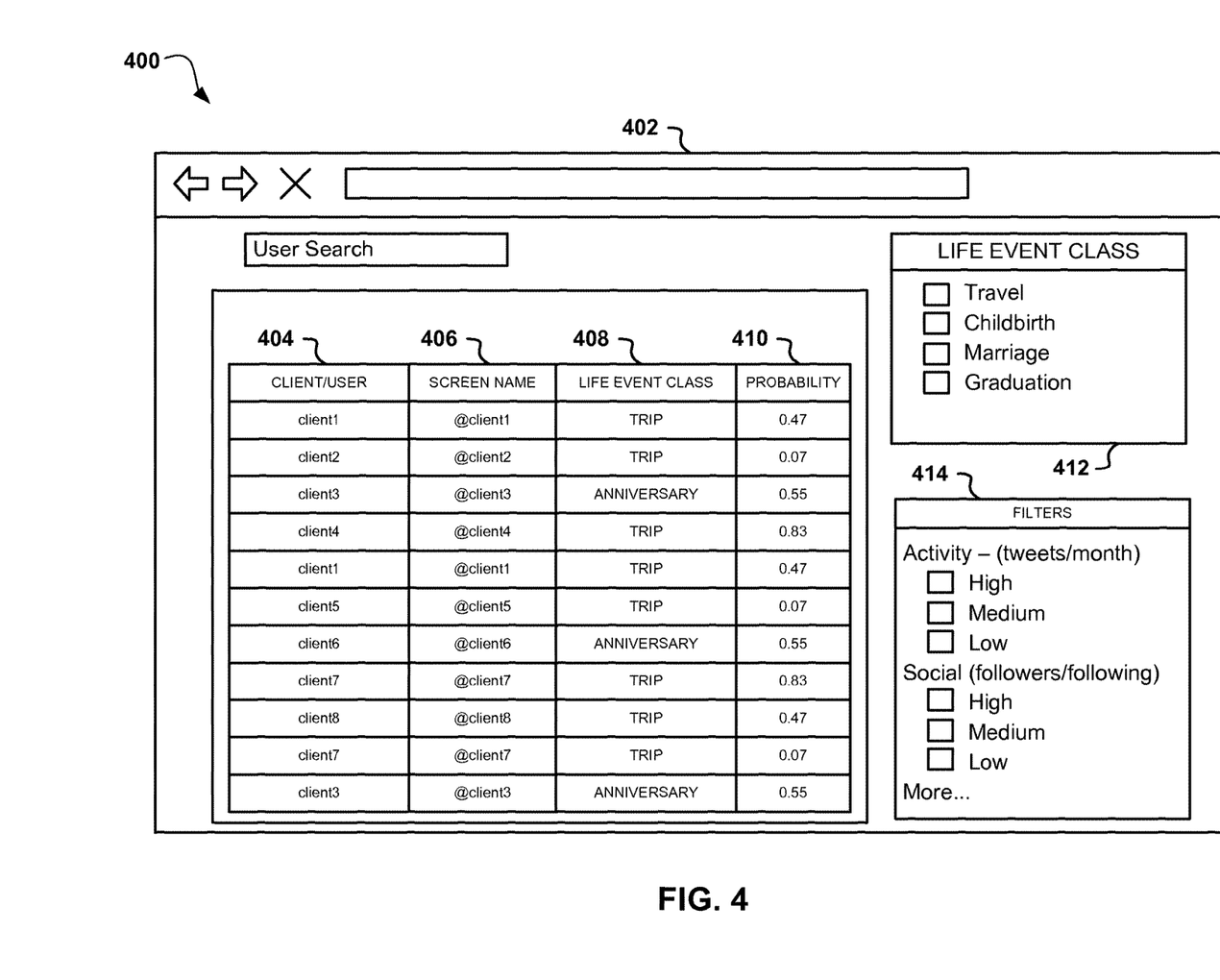
FIG. 4 is a functional block diagram of a summary of life event data, in accordance with one embodiment of the present invention.

Referring now to FIG. 4, a functional block diagram 400 of a summary of life event data is depicted, in accordance with one embodiment of the present invention. When a user is presented with the final classified conversation, the user may also be presented with a summary of life event data in a browser 402. The life event data may be structured in a spreadsheet format where rows represent single user posts and columns represent relevant data related to each post, such as client/user 404, screen name 406, life event class 408, and single post probability 410. Browser 402 may include a life event class filter panel 412 that may allow a user to filter out life event data based on the life event class. For example, if a user only wishes to observe single posts classified as "marriage" life events, the user would select the "marriage" radio box in life event class panel 412. Additionally, browser 402 may contain filter panel 414 which may allow a user to filter information based on a variety of statistical factors, such as user post activity and social media presence.

Figure 5:
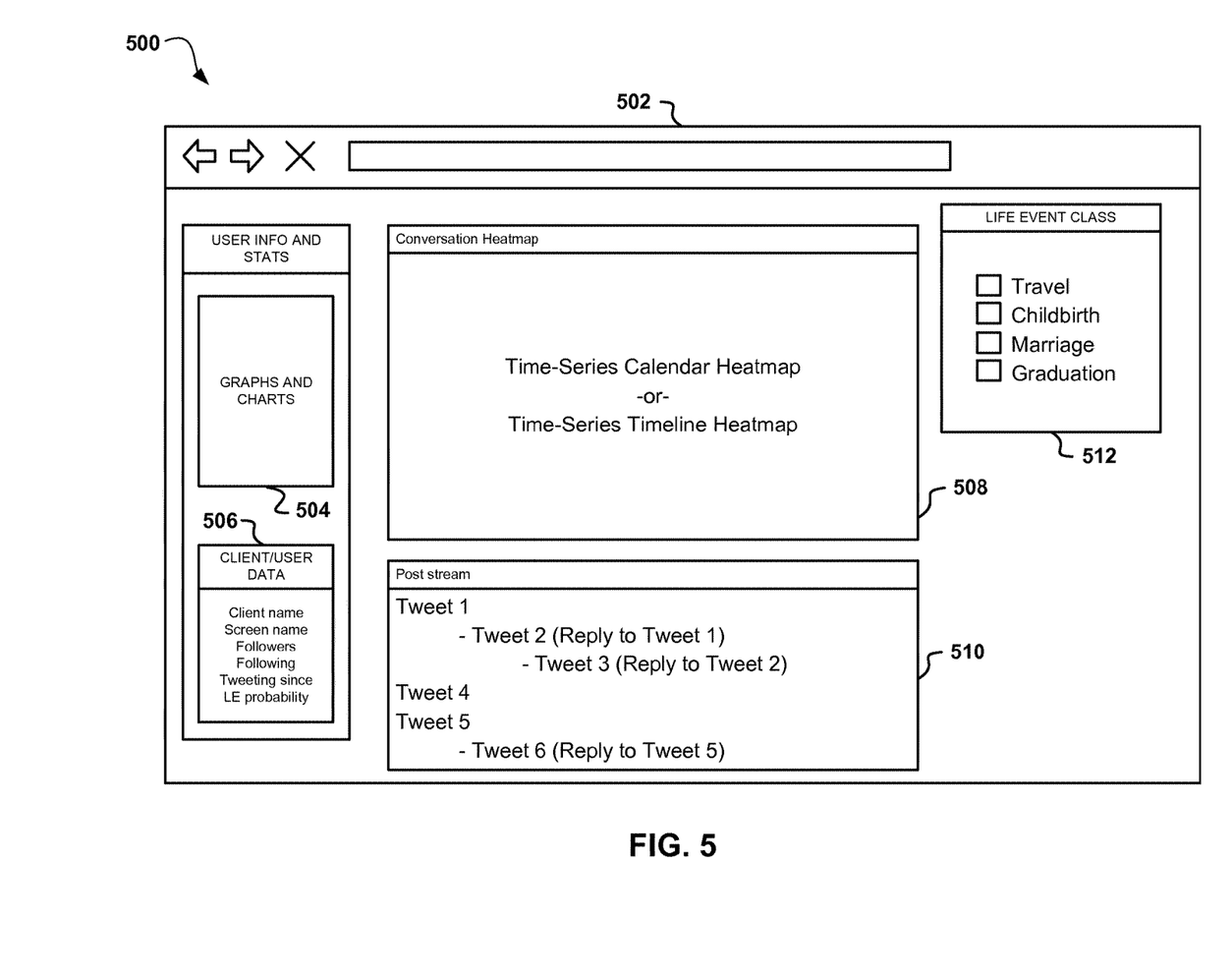
FIG. 5 is a functional block diagram illustrating a graphical user interface displaying conversation information and statistical life event data, in accordance with one embodiment of the present invention.

Referring now to FIG. 5, a functional block diagram 500 illustrating a graphical user interface displaying conversation information and statistical life event data is depicted, in accordance with one embodiment of the present invention. Browser 502 may display information relevant to a classified conversation, such as a graphs and charts 504 related to the classified conversation, client/user data 506, conversation heatmap 508, post stream 510, and life event class filter panel 512. Graphs and charts 504 may display statistical information relevant to the conversation. Client/user data 506 may include information specific to a particular user within the classified conversation, such as client/user name, screen name, number of followers, number of friends, number of people user is following, date the user joined the particular social network, and conversation life event probability. Conversation heatmap 508 may be a graph or chart displaying statistical user data. Conversation heatmap 508 may be presented in a calendar view or a timeline view. A calendar view of conversation heatmap 508 may show data arranged by year, month, week, or day and assign a color to each post within the displayed time period based on the single post probability score associated with a user selected life event class. A timeline view may allow a user to view single posts made for all life events in a single window ordered in a time versus probability arrangement for each life event class. Post stream 510 may be a window that displays all single user posts within the classified conversation. Life event class filter panel 512 may allow a user to filter out life event data based on the life event class.

Figure 6:
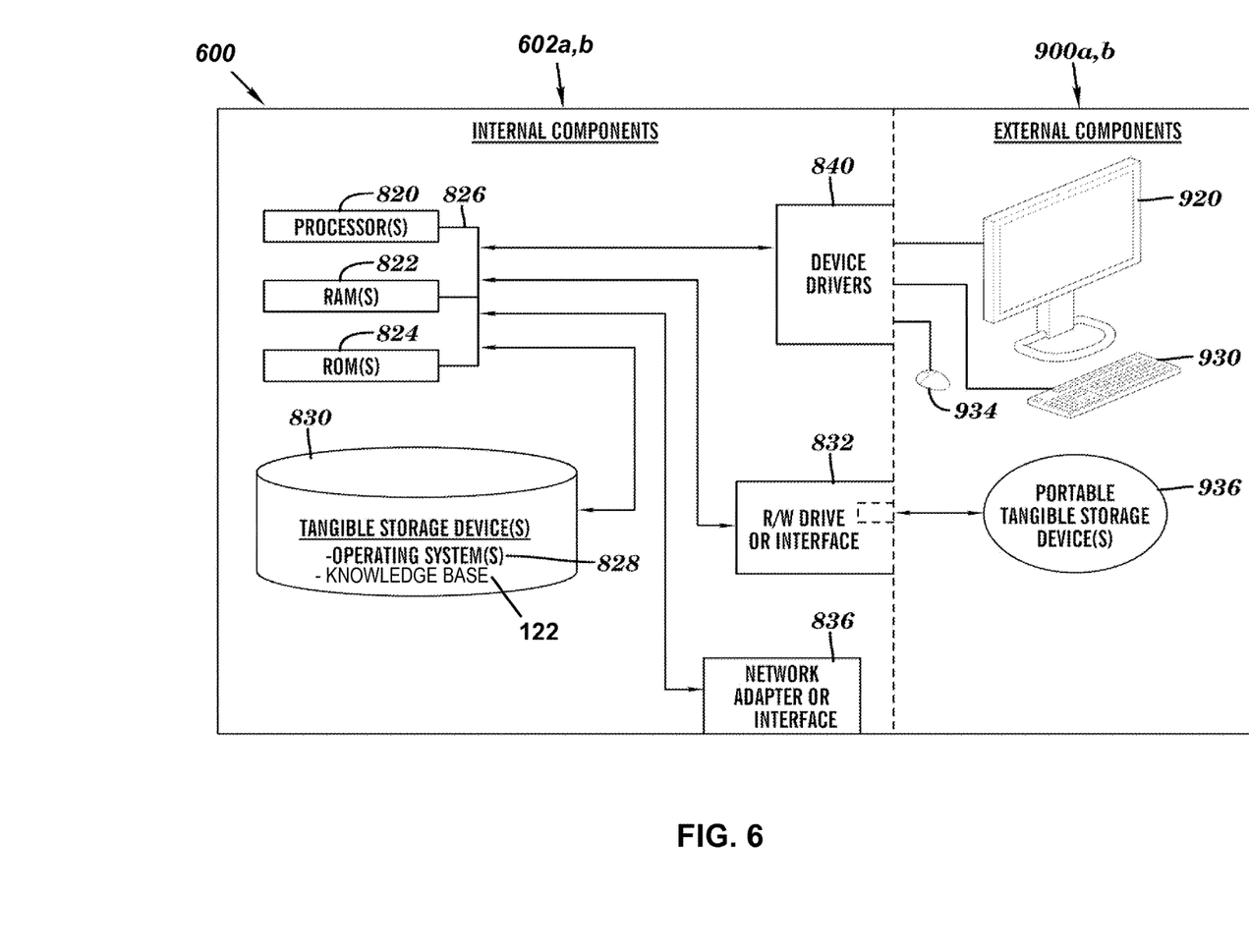
FIG. 6 depicts a cloud computing node according to an embodiment of the present invention.

FIG. 6 is a block diagram 600 of internal and external components of computer 110 and server 120A, 120B depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 602, 900 is representative of any electronic device capable of executing machine-readable program instructions. Data processing system 602, 900 may be representative of a smart phone, a computer system, PDA, or other electronic devices. Examples of computing systems, environments, and/or configurations that may represented by data processing system 602, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 110 and network server 120A, 120B may include respective sets of internal components 602 a,b and external components 900 a,b illustrated in FIG. 6. Each of the sets of internal components 602 include one or more processors 820, one or more computer-readable RAMs 822 and one or more computer-readable ROMs 824 on one or more buses 826, and one or more operating systems 828, one or more knowledge bases 122 and one or more computer-readable tangible storage devices 830. The one or more operating systems 828; life event identification program 112A in client computer 110; and life event identification program 112B in network server 120A are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 602 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as life event identification program 112A, 112B can be stored on one or more of the respective portable computer-readable tangible storage devices 936, read via the respective R/W drive or interface 832 and loaded into the respective hard drive 830.

Each set of internal components 602 a,b also includes network adapters or interfaces 836 such as a TCP/IP adapter cards, wireless Wi-Fi interface cards, or 3G or 4G wireless interface cards or other wired or wireless communication links. Life event identification program 112A in client computer 110 and life event identification program 112B in network server 120A can be downloaded to client computer 110 and network server 120A, 120B from an external computer via a network (for example, the Internet, a local area network or other, wide area network) and respective network adapters or interfaces 836. From the network adapters or interfaces 836, life event identification program 112A in client computer 110 and life event identification program 112B in network server 120A are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 602 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
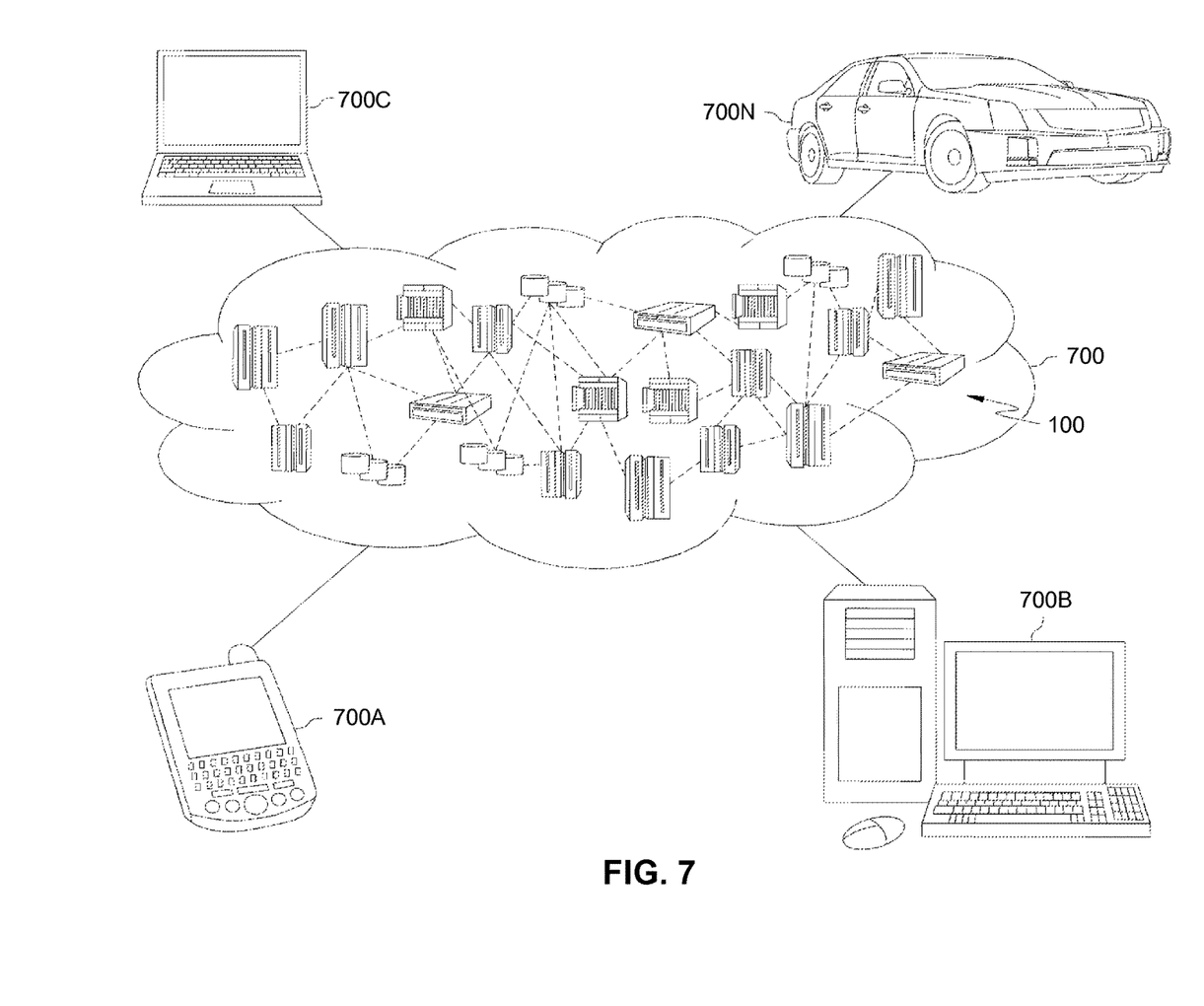
FIG. 7 depicts a cloud computing environment according to an embodiment of the present invention.

Referring now to FIG. 7, illustrative cloud computing environment 700 is depicted. As shown, cloud computing environment 700 comprises one or more cloud computing nodes 100 with which local computing devices used by cloud consumers, such as, for example, personal digital assistant (PDA) or cellular telephone 700A, desktop computer 700B, laptop computer 700C, and/or automobile computer system 700N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 700A-N shown in FIG. 7 are intended to be illustrative only and that computing nodes 100 and cloud computing environment 700 can communicate with any type of computerized device over any type of network and/or network addressable connection (e.g., using a web browser).

Figure 8:
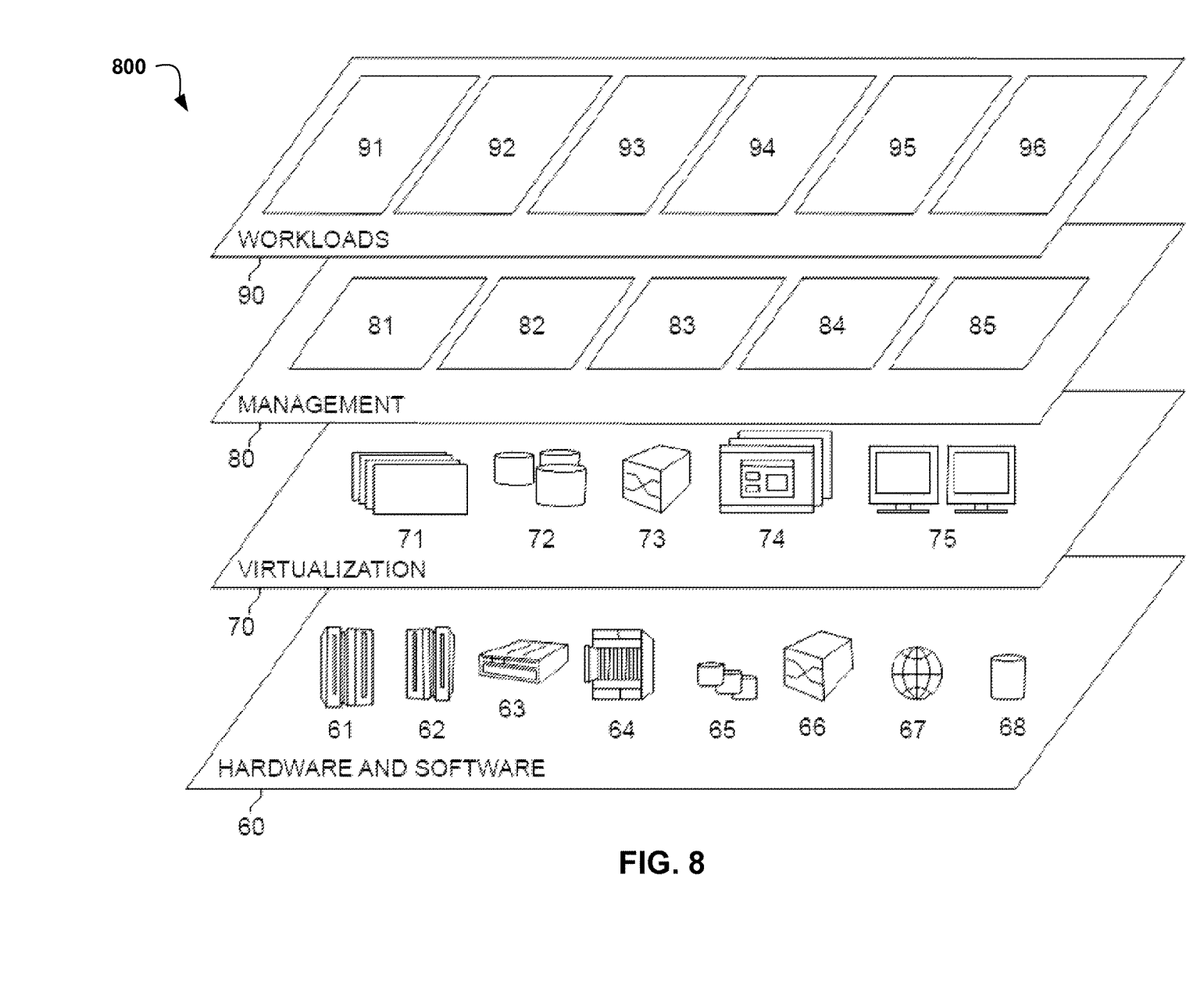
FIG. 8 depicts abstraction model layers according to an embodiment of the present invention.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and life event identification system 96. A life event identification system may allow for the filtering, classification, and consolidation of social media posts into conversations and classification into a life event class of each conversation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor implemented method for identifying a plurality of life events within a social network feed that enhances understanding of a context within which user discussions in social media posts are made and determines a probability with which each user discussion is associated with a specific life event, the method comprising:

receiving, by a processor, a plurality of social media data;
    identifying a plurality of life event data within the plurality of social media data;
    calculating, concurrently, a life event probability score associated with each of a plurality of life event classes for each of the plurality of life event data using a plurality of metadata associated with each of the plurality of life event data and a plurality of content associated with each of the plurality of life event data, wherein the plurality of life event classes is selected from a group consisting of a birthday class, a marriage class, a childbirth class, and a graduation class;

assigning a first life event class within the plurality of life event classes to each of the plurality of life event data based on the life event probability score;

creating a plurality of conversations, concurrently, by grouping the plurality of life event data associated with a common social media exchange;

extracting a plurality of metadata associated with the plurality of created conversations;

calculating, concurrently, a conversation probability score associated with each of the plurality of life event classes for each of the plurality of created conversations based on the extracted metadata and the determined life event probability score associated with each of the plurality of life event data within each of the plurality of created conversations;

assigning a second life event class within the plurality of life event classes to each of the plurality of created conversations based on the highest calculated conversation probability score;

generating a graphical user interface that displays a conversation report detailing one or more message times, a message frequency within each conversation, one or more post senders, a plurality of post content, one or more post timestamps, one or more life event classes associated with each post, and one or more calculated life event class probabilities; and transmitting the generated conversation report to a user.

2. The method of claim 1, wherein the plurality of social media data includes at least one of a plurality of user posts, a plurality of user comments, a plurality of user replies, and a plurality of user messages.

3. The method of claim 1, wherein the plurality of metadata associated with the plurality of created conversations includes at least one of a total number of users associated with each of the plurality of created conversations, a plurality of timestamp information for each of the plurality of life event data within each of the plurality of created conversations, and a life event class associated with each of the plurality of life event data.

4. The method of claim 1, wherein assigning the first life event class to each of the plurality of life event data includes assigning the life event class corresponding to the highest life event probability score.

5. The method of claim 1, wherein assigning a second life event class to each of the plurality of created conversations includes assigning the life event class corresponding to the highest conversation probability score.

6. The method of claim 1, wherein identifying the plurality of life event data includes filtering a plurality of social media data not associated with a life event, and wherein a life event includes at least one of a birthday, a graduation, a marriage, a childbirth, and a travel experience.

7. A computer system for identifying a plurality of life events within a social network feed that enhances understanding of a context within which user discussions in social media posts are made and determines a probability with which each user discussion is associated with a specific life event, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving a plurality of social media data;

identifying a plurality of life event data within the plurality of social media data;

calculating, concurrently, a life event probability score associated with each of a plurality of life event classes for each of the plurality of life event data using a plurality of metadata associated with each of the plurality of life event data and a plurality of content associated with each of the plurality of life event data, wherein the plurality of life event classes is selected from a group consisting of a birthday class, a marriage class, a childbirth class, and a graduation class;

assigning a first life event class within the plurality of life event classes to each of the plurality of life event data based on the life event probability score;

creating a plurality of conversations, concurrently, by grouping the plurality of life event data associated with a common social media exchange;

extracting a plurality of metadata associated with the plurality of created conversations;

calculating, concurrently, a conversation probability score associated with each of the plurality of life event classes for each of the plurality of created conversations based on the extracted metadata and the determined life event probability score associated with each of the plurality of life event data within each of the plurality of created conversations;

assigning a second life event class within the plurality of life event classes to each of the plurality of created conversations based on the highest calculated conversation probability score;

generating a graphical user interface that displays a conversation report detailing one or more message times, a message frequency within each conversation, one or more post senders, a plurality of post content, one or more post timestamps, one or more life event classes associated with each post, and one or more calculated life event class probabilities; and transmitting the generated conversation report to a user.

8. The computer system of claim 7, wherein the plurality of social media data includes at least one of a plurality of user posts, a plurality of user comments, a plurality of user replies, and a plurality of user messages.

9. The computer system of claim 7, wherein the plurality of metadata associated with the plurality of created conversations includes at least one of a total number of users associated with each of the plurality of created conversations, a plurality of timestamp information for each of the plurality of life event data within each of the plurality of created conversations, and a life event class associated with each of the plurality of life event data.

10. The computer system of claim 7, wherein assigning the first life event class to each of the plurality of life event data includes assigning the life event class corresponding to the highest life event probability score.

11. The computer system of claim 7, wherein assigning a second life event class to each of the plurality of created conversations includes assigning the life event class corresponding to the highest conversation probability score.

12. The computer system of claim 7, wherein identifying the plurality of life event data includes filtering a plurality of social media data not associated with a life event, and wherein a life event includes at least one of a birthday, a graduation, a marriage, a childbirth, and a travel experience.

13. A computer program product for identifying a plurality of life events within a social network feed that enhances understanding of a context within which user discussions in social media posts are made and determines a probability with which each user discussion is associated with a specific life event, the computer program product comprising:

one or more computer-readable tangible storage medium and program instructions stored on at least one of the one or more tangible storage medium, the program instructions executable by a processor, the program instructions comprising:

program instructions to receive a plurality of social media data;

program instructions to identify a plurality of life event data within the plurality of social media data;

program instructions to calculate, concurrently, a life event probability score associated with each of a plurality of life event classes for each of the plurality of life event data using a plurality of metadata associated with each of the plurality of life event data and a plurality of content associated with each of the plurality of life event data, wherein the plurality of life event classes is selected from a group consisting of a birthday class, a marriage class, a childbirth class, and a graduation class;

program instructions to assign a first life event class within the plurality of life event classes to each of the plurality of life event data based on the life event probability score;

program instructions to create a plurality of conversations, concurrently, by grouping the plurality of life event data associated with a common social media exchange;

program instructions to extract a plurality of metadata associated with the plurality of created conversations;

program instructions to calculate, concurrently, a conversation probability score associated with each of the plurality of life event classes for each of the plurality of created conversations based on the extracted metadata and the determined life event probability score associated with each of the plurality of life event data within each of the plurality of created conversations;

program instructions to assign a second life event class within the plurality of life event classes to each of the plurality of created conversations based on the highest calculated conversation probability score;

program instructions to generate a graphical user interface that displays a conversation report detailing one or more message times, a message frequency within each conversation, one or more post senders, a plurality of post content, one or more post timestamps, one or more life event classes associated with each post, and one or more calculated life event class probabilities; and program instructions to transmit the generated conversation report to a user.

14. The computer program product of claim 13, wherein the plurality of social media data includes at least one of a plurality of user posts, a plurality of user comments, a plurality of user replies, and a plurality of user messages.

15. The computer program product of claim 13, wherein the plurality of metadata associated with the plurality of created conversations includes at least one of a total number of users associated with each of the plurality of created conversations, a plurality of timestamp information for each of the plurality of life event data within each of the plurality of created conversations, and a life event class associated with each of the plurality of life event data.

16. The computer program product of claim 13, wherein assigning the first life event class to each of the plurality of life event data includes assigning the life event class corresponding to the highest life event probability score.

17. The computer program product of claim 13, wherein assigning a second life event class to each of the plurality of created conversations includes assigning the life event class corresponding to the highest conversation probability score.

* * * * *